(12) United States Patent
Davidi et al.

(10) Patent No.: US 9,707,681 B2
(45) Date of Patent: Jul. 18, 2017

(54) ANTI-COLLISION MANAGEMENT OF OVERLAPPING ROBOTIC MOVEMENTS

(71) Applicants: Dror Davidi, Hod Hasharon (IL); Moshe Hazan, Elad (IL); Rahav Madvil, Rishon Lezion (IL)

(72) Inventors: Dror Davidi, Hod Hasharon (IL); Moshe Hazan, Elad (IL); Rahav Madvil, Rishon Lezion (IL)

(73) Assignee: Siemens Industry Software LTD., Airport (IL)

( * ) Notice: Subject to any disclaimer, the term of this patent is extended or adjusted under 35 U.S.C. 154(b) by 17 days.

(21) Appl. No.: 14/810,171

(22) Filed: Jul. 27, 2015

(65) Prior Publication Data

US 2017/0028559 A1 Feb. 2, 2017

(51) Int. Cl.
*B25J 9/00* (2006.01)
*B25J 9/16* (2006.01)

(52) U.S. Cl.
CPC .................. *B25J 9/1682* (2013.01)

(58) Field of Classification Search
CPC ...... B25J 9/1676; B25J 9/1666; B25J 9/1697; G06T 2210/21; G06T 7/004; G05B 2219/40517; G05B 19/4061; G05B 19/4182; G05B 2219/32239; G05B 2219/49143; G05B 2219/50198
USPC .... 700/248, 245, 255, 250, 259; 701/23, 25, 701/26, 201, 533; 901/1, 2, 8, 14, 15; 382/153, 276
See application file for complete search history.

(56) References Cited

U.S. PATENT DOCUMENTS

| 5,247,608 | A | | 9/1993 | Flemming et al. |
| 5,798,627 | A | * | 8/1998 | Gilliland ................ B25J 9/1671 318/568.13 |
| 8,639,364 | B2 | * | 1/2014 | Stoddard ................ B25J 9/1669 700/14 |
| 9,278,452 | B2 | | 3/2016 | Brandenberger |
| 9,329,593 | B2 | * | 5/2016 | Izumi ................ G05B 19/41815 |

(Continued)

FOREIGN PATENT DOCUMENTS

EP 1901151 A1 3/2008

OTHER PUBLICATIONS

European Search Report for European Application No. 16178572.0-1927, mailed Mar. 9, 2017.

*Primary Examiner* — Dalena Tran
(74) *Attorney, Agent, or Firm* — Lempia Summerfield Katz LLC

(57) ABSTRACT

Systems and a method for anti-collision management of two or more robots with at least partially overlapping robotic movements are provided. The systems and method include receiving inputs from two or more single robots performing robotic operations along a trajectory defining for each robot a single swept volume. Discretized subswept volumes are created between robotic path locations for each single robot according to one or more discretization criteria such that the operation of each single robot moving along the known trajectory is controlled to allow synchronized execution of robotic operations. Only overlapping discretized subswept volumes are considered for synchronization. This enables focusing only on the relevant collision-prone areas. Deadlocks may be prevented by a look-ahead behavior. Smart synchronization methodology allows optimizing cycle time.

18 Claims, 5 Drawing Sheets

(56) References Cited

U.S. PATENT DOCUMENTS

2005/0273200 A1   12/2005  Hietmann et al.
2012/0215351 A1    8/2012  McGee et al.
2015/0336269 A1   11/2015  Linnell et al.

* cited by examiner

ANTI-COLLISION MANAGEMENT OF OVERLAPPING ROBOTIC MOVEMENTS

TECHNICAL FIELD

The present embodiments are directed, in general, to computer-aided design, visualization, and manufacturing ("CAD") systems, product lifecycle management ("PLM") systems, product data management ("PDM") systems, and similar systems that manage data for products and other items (collectively, "Product Data Management" systems or PDM systems), and, for example, to methods and systems for anti-collision management of two or more robots with at least partially overlapping robotic movements.

BACKGROUND

Robots are widely used in industrial applications and fulfill robotic operations along a trajectory. Collisions, which happen when two or more robots share the same space at the same time, are to be avoided, because collisions may result in serious damage to the robots, as well as the work pieces handled by the robots. Collision handling of robots is done by defining overlapping areas where the single swept volumes of individual single robots overlap. As the trajectories of individual single robots that share this overlapping area may overlap within the overlapping area, only one robot at time is allowed to enter the overlapping area at a time. Other robots that share this overlapping area are forced to be idle and thus be unproductive.

SUMMARY

As robots often share the entire work area in a very crowded shop floor, the overlapping areas are numerous and widespread, which leads to a great increase in production cycle time. This reduces efficiency and limits robot synchronization capabilities tremendously. Methods for collision handling that reduce idle waiting times of robots by allowing robots to execute robotic operations simultaneously are therefore to be provided.

Various disclosed embodiments include methods and systems for anti-collision management of two or more single robots (e.g., industrial robots) performing robotic operations. The systems and method include receiving inputs including a respective trajectory that each single robot follows to fulfill respective robotic operations. Each single robot along a corresponding trajectory is located within a single swept volume. The robotic operations of two or more single robots take place at least partly in a shared space such that at least two of the single swept volumes of individual single robots form an overlapping area where collisions between robots may occur. The systems and method include creating discretized subswept volumes between robotic path locations for each single robot according to one or more discretization criteria. Only overlapping discretized sub swept volumes of two or more single robots are considered for synchronization. The systems and method enable control of the two or more robots to reduce collisions while reducing idle waiting time of the one or more single robots simultaneously The foregoing has outlined rather broadly the features and technical advantages of the present embodiments so that those skilled in the art may better understand the detailed description that follows. Additional features and advantages of the disclosure will be described hereinafter. Those skilled in the art will appreciate that the conception and the specific embodiment disclosed may readily be used as a basis for modifying or designing other structures for carrying out the same purposes of the present embodiments. Those skilled in the art will also realize that such equivalent constructions do not depart from the spirit and scope of the disclosure in broadest form.

The terms "include" and "comprise," as well as derivatives thereof, represent inclusion without limitation. The term "or" is inclusive (e.g., and/or). The phrases "associated with" and "associated therewith," as well as derivatives thereof, may include: be included within, interconnect with, contain, be contained within, connect to or with, couple to or with, be communicable with, cooperate with, interleave, juxtapose, be proximate to, be bound to or with, have, have a property of, or the like. The term "controller" may be any device, system or part thereof that controls at least one operation, whether such a device is implemented in hardware, firmware, software or some combination of at least two of the same. The functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, where like numbers designate like objects, and in which.

DETAILED DESCRIPTION

FIGS. 1 through 5, discussed below, and the various embodiments are by way of illustration only and should not be construed in any way to limit the scope of the invention. Those skilled in the art will understand that the principles of the present disclosure may be implemented in any suitably arranged device. The numerous teachings of the present application will be described with reference to exemplary non-limiting embodiments.

Determining the most efficient synchronization for the cooperative execution of robotic operations of two or more robots in order to achieve minimal cycle time and to increase efficiency takes consideration of numerous constraints including whether any collisions occur between the robots, whether robots run into dead-lock situations, and which one of the robots is given prioritization when cooperative execution is not possible due to collisions and/or dead-lock situations, along with other considerations.

Robots perform robotic operations, whereby each single robot along a corresponding trajectory is located within a single swept volume. When the robotic operations of two or more individual single robots share the same space, at least parts of the single swept volumes of individual single robots form an overlapping area where collisions between robots may occur. Allowing only one individual single robot at a time to enter the overlapping area reduces the risk of collisions, but increases production cycle time tremendously.

Each new overlapping area and/or each additional third or more robot sharing the overlapping area of two or more single swept volumes lead to additional episodes of idle waiting time during the performance of robotic operations. This issue is further amplified because a typical shop floor is very crowded, and industrial robots often share the entire work area.

Applying this approach on every robot in a production line reduces the idle waiting time tremendously, resulting in optimized cycle time and thus reduced overall production costs.

Figure 1:
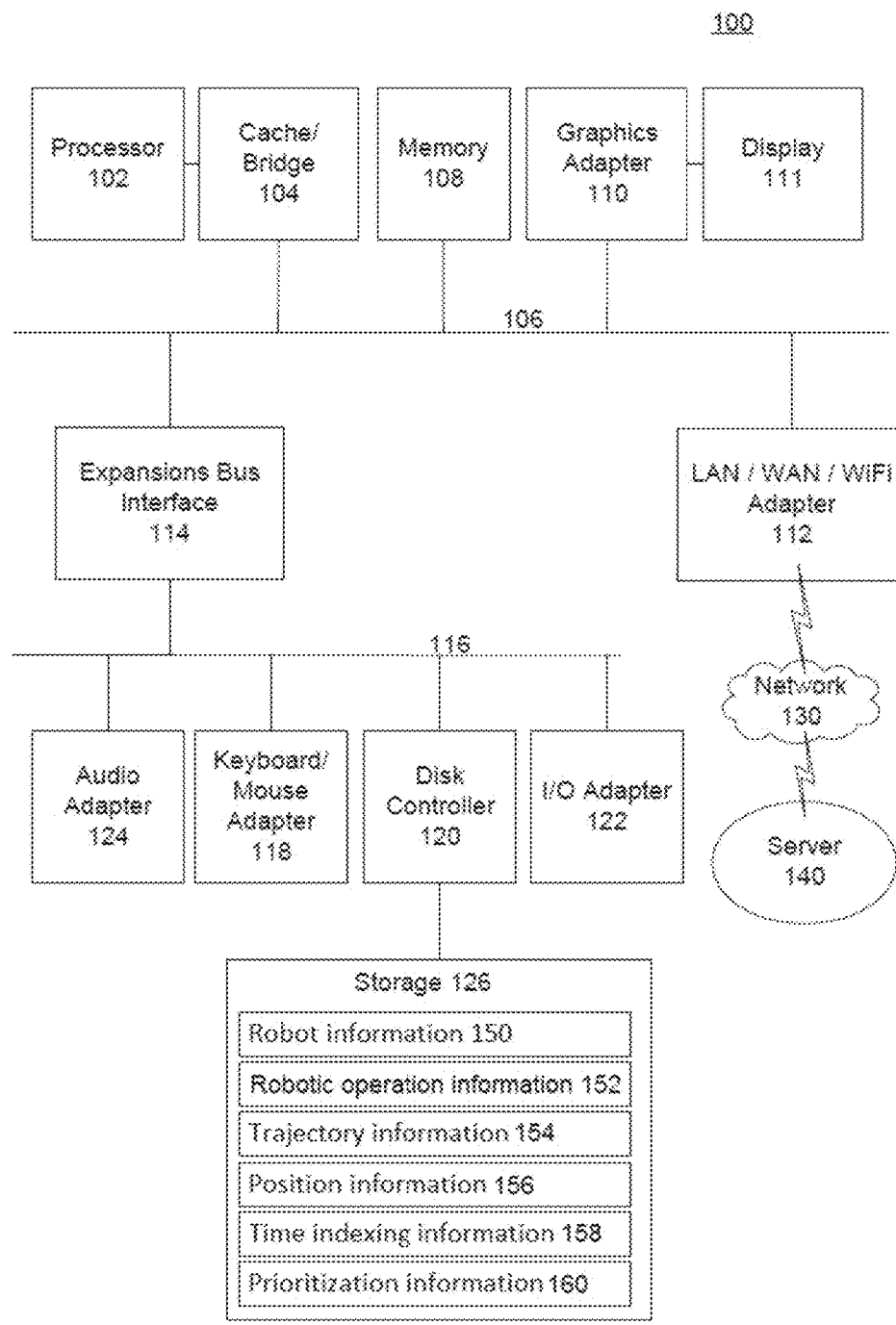
FIG. 1 illustrates a block diagram of one embodiment of a data processing system.

FIG. 1 illustrates a block diagram of one embodiment of a data processing system (e.g., as a PDM system configured by software or otherwise to perform the processes as described herein and as each one of a plurality of interconnected and communicating systems, as described herein). The data processing system illustrated may include a processor 102 connected to a level two cache/bridge 104, which is connected to a local system bus 106. Local system bus 106 may be, for example, a peripheral component interconnect (PCI) architecture bus. Also connected to local system bus in the illustrated example are a main memory 108 and a graphics adapter 110. The graphics adapter 110 may be connected to display 111.

Other peripherals, such as local area network (LAN)/ Wide Area Network/Wireless (e.g., WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 may be connected to a storage 126 that may be any suitable machine usable or machine readable storage medium including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. The storage 126 stores the robot information 150 and corresponding robotic operation information 152. The Robotic operation information 152 may include, for example, the trajectory information 154, the position information 156, the time indexing information 158, the prioritization information 160, etc., which are described below.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, track pointer, touchscreen, etc.

Those of ordinary skill in the art will appreciate that the hardware illustrated in FIG. 1 may vary for particular implementations. For example, other peripheral devices, such as an optical disk drive and the like, may also be used in addition to or in place of the hardware illustrated. The illustrated example is provided for the purpose of explanation only and is not meant to imply architectural limitations with respect to the present embodiments.

A data processing system in accordance with an embodiment may include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed, and/or an event such as clicking a mouse button may be generated to actuate a desired response.

One of various commercial operating systems, such as a version of Microsoft Windows™, a product of Microsoft Corporation located in Redmond, Wash., may be employed if suitably modified. The operating system is modified or created in accordance with the present embodiments, as described.

LAN/WAN/Wireless adapter 112 may be connected to a network 130 (not a part of data processing system 100), which may be any public or private data processing system network or combination of networks, as known to those of skill in the art, including the Internet. Data processing system 100 may communicate over network 130 with server system 140, which is also not part of data processing system 100, but may be implemented, for example, as a separate data processing system 100.

Figure 2:
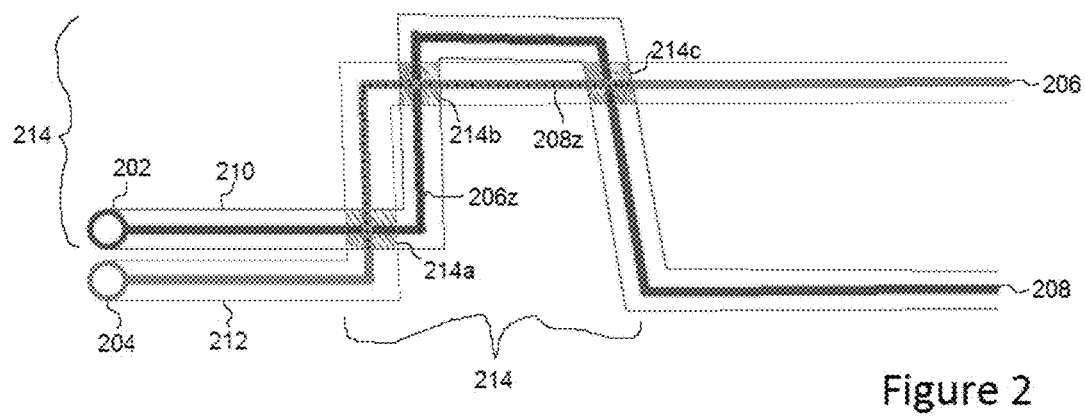
FIG. 2 is a schematic illustration of a robot synchronization according to prior art.

FIG. 2 is a schematic illustration of a method for anti-collision management of overlapping robotic movements according to prior art. Shown are two robots 202, 204 performing robotic operations along corresponding trajectories 206, 208 such that the robots are always located within their single swept volumes 210, 212. The single swept volumes 210, 212 represent the captured volume during operation. The robots 202, 204 may collide with each other whenever corresponding single swept volumes 210, 212 form a single overlapping area 214. Area is used for three-dimensional objects, and area may be used more generally to also describe two-dimensional objects.

The single overlapping area 214 is encountered whenever the robots 202, 204 are located on the parts 206z, 208z of the trajectories 206, 208 (graphically indicated by crosses). However, only the overlapping segments 214a, 214b, 214c of the single overlapping area 214 are actually relevant collision-prone areas where collisions may occur. In order to avoid collision with a method of prior art, whenever one of the robots 202, 204 (e.g., the robot 204) enters the overlapping area, the other robot 202, which shares this overlapping area 214, is idle and may not move until the overlapping area 214 is cleared by the robot 204.

The idle waiting time of the robot 202 is a considerable proportion of the total runtime, assumed that runtime and swept volume correlate with each other in some respects. When more than two robots 202, 204 are involved in a process in a very crowded shop-floor, many single overlapping areas are formed and/or the single overlapping areas are shared by more than only two robots. This greatly increases production cycle time, reduces efficiency and limits robot synchronization capabilities.

Figure 3:
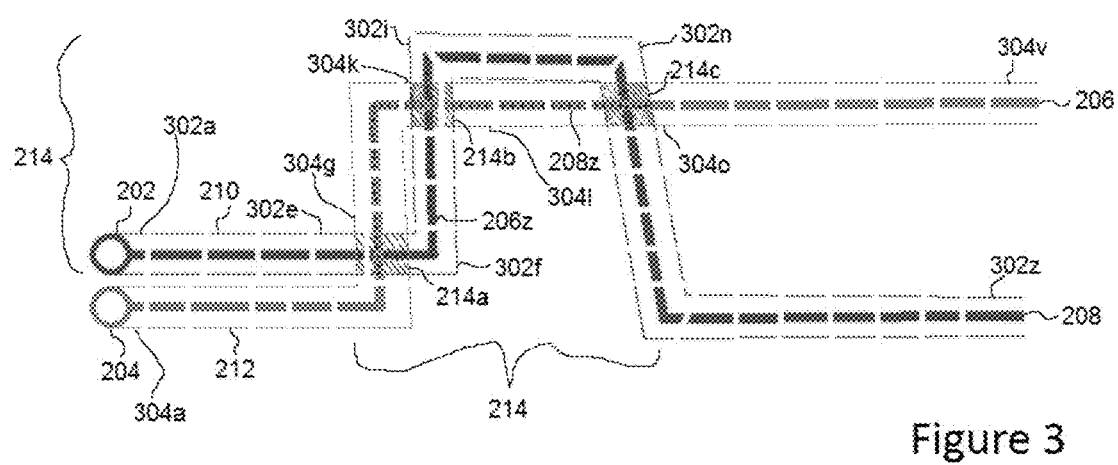
FIG. 3 is a schematic view of the two exemplary robots, where corresponding single swept volumes are subdivided.

FIG. 3 is a schematic view of the two single robots 202, 204 of FIG. 2, illustrating a method for anti-collision management in accordance with the disclosed embodiments. The two single robots 202, 204 perform robotic operations, whereby the data processing system receives inputs including the trajectories 206, 208 that each single robot 202, 204 follows to fulfill corresponding robotic operations. As already shown in FIG. 2, each single robot 202, 204 along the respective trajectory 206, 208 is located within a single swept volume. The robotic operations of the two robots 202, 204 take place at least partly in a shared space such that corresponding single swept volumes form the overlapping area 214 with collision prone segments 214a, 214b, 214c.

Discretized sub swept volumes are created between robotic path locations for each single robot according to one or more discretization criteria. The single swept volumes 210, 212 are thus divided, as shown in FIG. 3. Time indexing is added to the robotic operations of all subswept volumes in order to allow on-line knowledge about the position of the robot and to enable application of a smart synchronization methodology that will be described in more detail below.

The subswept volumes 302a, 302e, 302f, 302i, 302n, 302z of the robot 202 and the subswept volumes 304a, 304g, 304k, 304l, 304o, 304v of the robot 204 are indicated. A combination of all subswept volumes 302a-302z of robot 202, and of all subswept volumes 304a-304v of robot 204, respectively, yields exactly the single swept volume 210 and 212, respectively.

Overlapping with the subswept volumes of the respective other robot are only the subswept volumes 302e, 302f, 302i, 302n, 304g, 304k, 304l, 304o. The neighboring single swept volumes 302e, 302f overlap with the single swept volume 304g including the overlapping segment 214a. The single swept volume 302i overlaps with the neighboring single swept volumes 304k, 304l including the overlapping segment 214b. The single swept volumes 302n overlaps with the single swept volume 304o including the overlapping segment 214c.

The operation of each single robot moving along the known trajectory is controlled in order to allow synchronized execution of robotic operations. Synchronization may be event based and/or time based. For robotic synchronization, only the overlapping discretized subswept volumes 302e, 302f, 302i, 302n, 304g, 304k, 304l, 304o are to be considered for robotic synchronization instead of the entire single overlapping area 214, as done in prior art. Therefore, the robots 202, 204 may simultaneously perform robotic operations within all of the other subswept volumes. Both robots 202, 204 may start moving immediately and continue working until the overlapping area 214 (e.g., the first overlapping subswept volumes 302e, 304g including the first small overlapping segment 214a) is reached. Robot 204 only waits idle during the runtime of the two subswept volumes 302e, 302f before entering the subswept volume 304g and not during the entire runtime of the robotic operations performed within the entire overlapping area 214. The other robot 304 may enter the subswept volume 304g immediately after the robot 302 has cleared the subswept volume 302f. The described method is applied repeatedly for each single overlapping subswept volume.

Once the overlapping segment 214a is encountered, an operation priority is assigned based upon a prioritization criteria. The operation priority is assigned even if there is currently no other robot operating within the overlapping segment 214a (e.g., in order to avoid potential deadlock situations). The prioritization criteria identify which of the single robots has a higher priority. The prioritization criteria include speed, importance, runtime, look-ahead behavior, acceleration characteristics, or any combination thereof. In one embodiment, the prioritization criteria are selected from this group exclusively. These prioritization criteria enable a full picture of all possible future collisions. Therefore, it may be planned what is the best solution that allows an efficient completion of the whole process by achieving minimal cycle time. FIG. 3 depicts the basic concept of anti-collision management for two robots 202, 204, but this basic concept may be expanded to three or more single robots.

Figure 4:
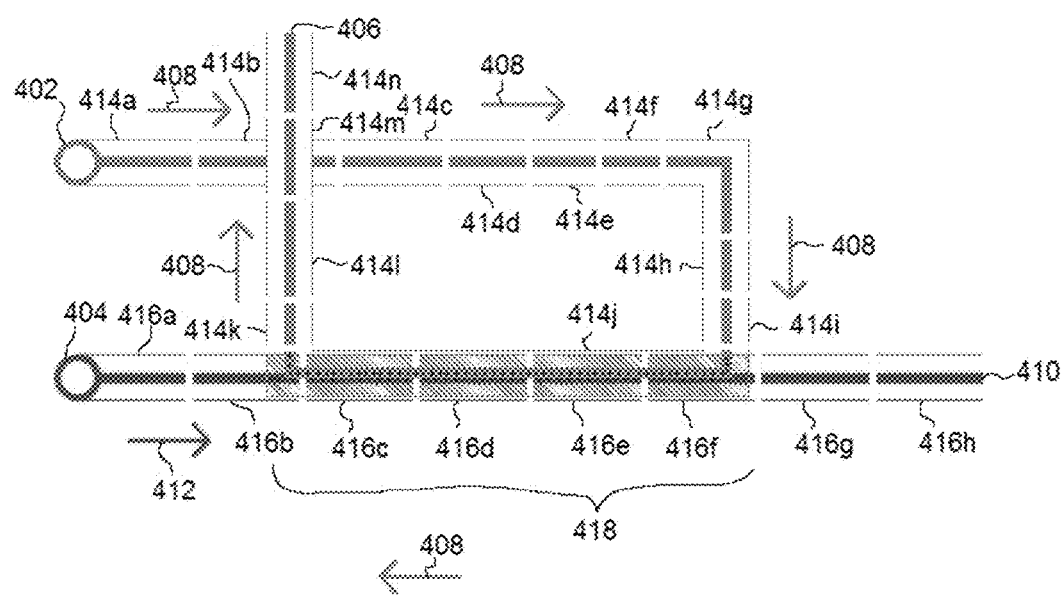
FIG. 4 illustrates schematically a potentially arising deadlock-situation of two robots.

FIG. 4 illustrates schematically a potentially arising deadlock-situation of two robots 402, 404 in accordance with disclosed embodiments. Initially, both robots 402, 404 are located graphically on the left hand side of the drawing. The robot 402 follows its trajectory 406 moving along direction of movement 408 first to the right and then downward before making a change of direction to the left and then again upwards. The robot 404 only moves linear to the right along trajectory 410 following its direction of movement 412. Discretized subswept volumes 414a-414n, 416a-416h are created at runtime between robotic path locations of both robots 402, 404. Whenever one of the robots enters a section of the trajectories 406, 410 marked with crosses, the one robot is located within an overlapping area 418 where collisions might occur.

The discretized subswept volumes 414a-414n, 416a-416h are created at runtime according to one or more discretization criteria. The one or more discretization criteria include time, location, volume, speed, subgrouping of the robotic operations, or any combination thereof in order to achieve subswept volumes 414a-414n, 416a-416h that may be handled optimally. In one embodiment, the one or more discretization criteria may be selected from this group exclusively. The subswept volumes 416a-416h of the linearly moving robot 404 are created between equidistant robotic path locations. Therefore, all of the subswept volumes 416a-416h are of equal volume. The subswept volumes 414a-414n of the robot 402 with changing direction of movement 408 are created according to a different discretization criteria. The subswept volume 414j includes all of the overlapping area 418.

The potential deadlock-situation may arise because the robot 402 changes the direction of movement 408 shortly after entering the subswept volume 414j. If the other robot 404 moves into the direction of movement 412, opposite to the direction of movement 408 of the first robot 402, and enters the overlapping area 418 partly located within the subswept volume 416b, both robots may block each other's way. Therefore, in order to avoid deadlocks, time indexing is added to the robotic operations of all subswept volumes 414a-414n, 416a-416h. The time indexing enables application of the smart synchronization technology that prevents from a robot 402 to enter the overlapping area 418, even if there is currently no other robot 404 inside. The decision whether the robot 402 is allowed to enter the overlapping area 418 is done once the overlapping area 418 is encountered. An operation priority is assigned based upon a prioritization criteria. The operation priority is assigned even if there is currently no other robot 404 operating within the overlapping area 418. This prevents the occurrence of deadlock situations.

The robot 402 waits idle while the other robot 404 performs robotic operations within the subswept volumes 416b-416f including the overlapping area 418. After clearing the overlapping area 418, the other robot 402 enters the subswept volume 414j including the overlapping area 418.

The prioritization criteria identify which of the single robots 402, 404 has a higher priority and therefore enable implementation of a smart synchronization technology. The prioritization criteria include speed, importance, runtime, look-ahead behavior, acceleration characteristics, or any combination thereof. In one embodiment, the prioritization criteria are selected from this group exclusively. If both robots 402, 404 require the same runtime for all of the remaining subswept volumes 414a-414n, 416a-416h after clearing the overlapping area 418, priority may be given to the robot 402 or 404 that passes the overlapping area 306 the fastest. Besides speed and runtime, other considerations may contribute to the prioritization (e.g., consideration of possible next encountered overlapping swept volumes, different accelerations of the robots 402, 404).

Figure 5:
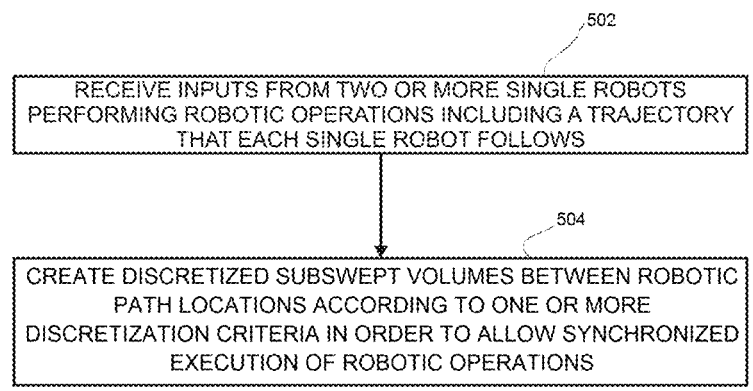
FIG. 5 illustrates a flowchart of a process to optimally manage collisions between robots in accordance with disclosed embodiments.

FIG. 5 illustrates a flowchart of a process for optimally tooling a robot in accordance with disclosed embodiments. The anti-collision management of overlapping robotic movements is performed by a data processing system, such as the data processing system 100 of FIG. 1. The system receives inputs from two or more single robots performing robotic operations including a trajectory that each single robot follows (act 502). For each single robot, the inputs may include robot information 150 and robotic operation information 152. From this, trajectory information 154, position information 156, time indexing information 158, and prioritization information 160 may be calculated at runtime. Another option may be to provide the trajectory information 154, the position information 156, the time indexing information 158 and the prioritization information 160 at least partially as operation input.

The robot information 150 may include the specific tasks that the robot fulfills, the dimensions of the robot, the robot's surrounding, the objects that are mounted on the robot, and any objects pertinent to the placement or location of the robot. The robotic operation information 152 may include all information about the robotic operations of the robot. The trajectory information 154 that may also be extracted from the robotic operation information 152, alongside with the dimensions of the robots, is to be provided and may be used to calculate the swept volumes within which each single robot along a corresponding trajectory is located. The robotic operation information 152 with the dimensions of the robot and surrounding of the robot enables knowledge about the single swept volumes, within which each single robot along the corresponding trajectory is located. However, an a priori calculation of the single swept volume of each single robot is not needed in order to apply the method for anti-collision management. The robotic operations of two or more single robots take place at least partly in a shared space. The system identifies which of the single swept volumes of individual single robots form an overlapping area where collisions between robots may occur. One or more of the processor 102 and the memory 108 running on the processor 102 receive the inputs via one or more of the local system bus 106, the adapter 112, the network 130, the server 140, the interface 114, the I/O bus 116, the disk controller 120, the storage 126, and so on. Receiving, as used herein, may include retrieving from storage 126, receiving from another device or process, receiving via an interaction with a user, or otherwise.

The system then creates discretized subswept volumes between robotic path locations according to one or more discretization criteria in order to allow synchronized execution of robotic operations (act 504). In the case where a robot moves back and forth during operation, neighboring subswept volumes may at least partially overlap. The overlapping area includes, for example, many small individual overlapping areas. The operation of each single robot moving along the known trajectory is controlled in order to allow synchronized execution of robotic operations. Only overlapping discretized subswept volumes of different individual robots are considered for synchronization. This enables control of the two or more robots to reduce collisions while reducing idle waiting time of the other one or more single robots simultaneously. The robots may work simultaneously everywhere but in the overlapping area.

The system applies smart synchronization methodology to control each single robot using the provided or calculated time indexing information 158 of all subswept volumes alongside with the prioritization information 160 and the robotic operation information 152 (e.g., the trajectory information 154). Smart synchronization methodology takes into account and/or predicts all movement possibilities, deciding for any given overlapping area what should be the prioritization between robots in order to achieve minimal cycle time. To synchronize the robots, events and signals may also be used. For example, one robot may wait for the other robot to send a signal that the other robot has left an overlapping area.

Each single swept volume is subdivided according to one or more discretization criteria in order to achieve optimal subdivision. The one or more discretization criteria include time, location, volume, speed, logical subgrouping of the robotic operations, or any combination thereof. The discretization criteria time might be chosen such that the runtime of robotic operations executed within each subswept volume is equal, which simplifies time indexing. Location as discretization criteria may be chosen such that all trajectory sections between starting and end path location of the robot are equal. When a robot has a constant speed at each point of the trajectory, the discretization criteria time and location are congruent with each other. Equal initial subswept volumes may result when volume is chosen as discretization criteria. The discretization criteria speed may be applied in a way being congruent to time, or involve a subgrouping of the speed of the robot. For example, when the robot moves linearly with constant speed along the corresponding trajectory, a subswept volume may be created such that the robot is located within the subswept volume until the robot changes speed. Subgrouping of the robotic operations is more broadly defined and may be congruent with the above mentioned discretization criteria. The subgrouping may, however, be a subdivision such that a robot is executing specific tasks within one subswept volumes, while the robot only displaces itself within the other subswept volumes.

Those of skill in the art will recognize that, unless specifically indicated or required by the sequence of operations, certain acts in the processes described above may be omitted, performed concurrently or sequentially, or performed in a different order.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

While the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include:

nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element that must be included in the claim scope. The scope of patented subject matter is defined only by the allowed claims. None of these claims are intended to invoke paragraph six of 35 USC §112 unless the exact words "means for" are followed by a participle.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for anti-collision management of two or more single robots performing robotic operations, the method comprising:
receiving, by a data processing system, inputs, the inputs including a respective trajectory that each single robot of the two or more single robots follows to fulfill robotic operations, wherein each single robot along a trajectory is located within a respective single swept volume, and wherein the robotic operations of the two or more single robots take place at least partly in a shared space such that at least two of the single swept volumes of individual single robots form an overlapping area where collisions between robots may occur; and
creating, by the data processing system prior to operation of the two or more single robots, discretized subswept volumes between robotic path locations for each single robot according to one or more discretization criteria such that the operation of each single robot moving along the known trajectory is controlled in order to allow synchronized execution of robotic operations, only overlapping discretized subswept volumes being considered for synchronization.

2. The method of claim 1, wherein the one or more discretization criteria are selected from a group consisting of time, location, volume, speed, and subgrouping of the robotic operations.

3. The method of claim 2, further comprising adding time indexing to the robotic operations of all subswept volumes.

4. The method of claim 3, further comprising assigning an operation priority based on a prioritization criteria once the overlapping area of the subswept volumes of two single robots is encountered, the operation priority being assigned even when there is currently no other robot operating within the overlapping area.

5. The method of claim 4, wherein the prioritization criteria identify which of the single robots has a higher priority, the prioritization criteria being selected from a group consisting of speed, importance, runtime, acceleration, and look-ahead behavior.

6. The method of claim 1, wherein the discretized subswept volumes are created at runtime.

7. A data processing system for anti-collision management of two or more single robots performing robotic operations, the data processing system comprising:
a processor; and
an accessible memory,
wherein the processor is configured to:
receive inputs including a trajectory that each single robot of the two or more single robots follows to fulfill respective robotic operations, wherein each single robot along a respective trajectory is located within a single swept volume, and wherein the robotic operations of the two or more single robots take place at least partly in a shared space such that at least two of the single swept volumes of individual single robots form an overlapping area where collisions between robots are occurible; and
create, prior to operation of the two or more single robots, discretized subswept volumes between robotic path locations for each single robot according to one or more discretization criteria such that the operation of each single robot moving along the known trajectory is controlled in order to allow synchronized execution of robotic operations, only overlapping discretized subswept volumes being considered for synchronization.

8. The data processing system of claim 7, wherein the one or more discretization criteria are selected from a group consisting of time, location, volume, speed, and subgrouping of the robotic operations.

9. The data processing system of claim 8, wherein time indexing is added to the robotic operations of all subswept volumes.

10. The data processing system of claim 9, wherein the processor is further configured to assign an operation priority based upon a prioritization criteria once an overlapping area of the subswept volumes of two single robots is encountered, the operation priority being assigned even when there is currently no other robot operating within the overlapping area.

11. The data processing system of claim 7, wherein the prioritization criteria identify which of the single robots has a higher priority, the prioritization criteria being selected from a group consisting of speed, importance, runtime, acceleration, and look-ahead behavior.

12. The data processing system of claim 7, wherein the discretized subswept volumes are created at runtime.

13. A non-transitory computer-readable medium encoded with executable instructions that, when executed, cause one or more data processing systems to manage anti-collision of two or more single robots performing robotic operations, the executable instructions comprising:
receiving inputs, the inputs including a respective trajectory that each single robot follows to fulfill robotic operations, wherein each single robot along the respective trajectory is located within a respective single swept volume, and wherein the robotic operations of the two or more single robots take place at least partly in a shared space such that at least two of the single swept volumes of individual single robots form an overlapping area where collisions between robots are occurible; and creating, prior to operation of the two or more single robots, discretized subswept volumes between robotic path locations for each single robot according to one or more discretization criteria such that the operation of each single robot moving along the known trajectory is controlled in order to allow synchronized execution of robotic operations, only overlapping discretized subswept volumes being considered for synchronization.

14. The non-transitory computer-readable medium of claim 13, wherein the one or more discretization criteria are selected from a group consisting of time, location, volume, speed, and subgrouping of the robotic operations.

15. The non-transitory computer-readable medium of claim 14, further comprising adding time indexing to the robotic operations of all subswept volumes.

16. The non-transitory computer-readable medium of claim 15, further comprising assigning an operation priority based on a prioritization criteria once an overlapping area of the subswept volumes of two single robots is encountered, the operation priority being assigned even when there is currently no other robot operating within the overlapping area.

17. The non-transitory computer-readable medium of claim 13, wherein the prioritization criteria identify which of the single robots has a higher priority, the prioritization criteria being selected from a group consisting of speed, importance, runtime, acceleration, and look-ahead behavior.

18. The non-transitory computer-readable medium of claim 13, wherein the discretized subswept volumes are created at runtime.

* * * * *